United States Patent
Moon et al.

(10) Patent No.: US 11,023,703 B2
(45) Date of Patent: Jun. 1, 2021

(54) ULTRASONIC SENSOR, ULTRASONIC SENSING DEVICE, DISPLAY DEVICE AND BIOMETRIC DATA SENSING METHOD

(71) Applicant: LG Display Co., Ltd., Seoul (KR)

(72) Inventors: TaeHyoung Moon, Gyeonggi-do (KR); JaeHoon Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/658,879

(22) Filed: Oct. 21, 2019

(65) Prior Publication Data

US 2020/0143133 A1 May 7, 2020

(30) Foreign Application Priority Data

Nov. 2, 2018 (KR) .................. 10-2018-0133753

(51) Int. Cl.
*G06K 9/00* (2006.01)
*G06F 3/044* (2006.01)

(52) U.S. Cl.
CPC ......... *G06K 9/0002* (2013.01); *G06F 3/0446* (2019.05)

(58) Field of Classification Search
CPC ........................ G06K 9/0002; G06F 3/0446
USPC .................... 345/78, 173; 378/4; 235/470
See application file for complete search history.

(56) References Cited

U.S. PATENT DOCUMENTS

| | | | | |
|---|---|---|---|---|
| 5,919,135 | A * | 7/1999 | Lemelson | A61B 5/055 378/4 |
| 2007/0024546 | A1* | 2/2007 | Jang | G06K 9/0002 345/78 |
| 2013/0206840 | A1* | 8/2013 | Furlong | G06K 7/10722 235/470 |
| 2014/0176402 | A1* | 6/2014 | Lee | G09G 3/32 345/77 |
| 2016/0246431 | A1* | 8/2016 | Ma | G06F 3/0416 |
| 2018/0046836 | A1* | 2/2018 | Hinger | G06K 9/0002 |
| 2018/0129849 | A1* | 5/2018 | Strohmann | G06K 9/2018 |
| 2019/0065806 | A1* | 2/2019 | Cheng | H01L 27/3244 |
| 2020/0167026 | A1* | 5/2020 | Lee | G06F 3/0414 |
| 2020/0167537 | A1* | 5/2020 | Lee | G06K 9/0002 |

* cited by examiner

*Primary Examiner* — Prabodh M Dharia
(74) *Attorney, Agent, or Firm* — Fenwick & West LLP

(57) ABSTRACT

According to the embodiments of the present disclosure, an ultrasonic sensor, an ultrasonic sensing device, a display device, and a biometric information sensing method are provided, in which a first transistor and a second transistor disposed in respective pixels adjacent to each other are driven by a same scan line, and the first transistor controlling the application of a high voltage and the second transistor controlling sensing are configured with different channel types; therefore, a driving interval for generating ultrasonic waves is separated in time from a sensing interval for sensing reflected ultrasonic waves. Accordingly, an interval for applying the high voltage is reduced; therefore, power consumption can be reduced, and the degradation of components constituting the ultrasonic sensor can be overcome or reduced. In addition, sensing can be performed in an area in which ultrasonic waves are generated; thus, sensing sensitivity can be improved.

20 Claims, 10 Drawing Sheets

ULTRASONIC SENSOR, ULTRASONIC SENSING DEVICE, DISPLAY DEVICE AND BIOMETRIC DATA SENSING METHOD

CROSS-REFERENCE TO RELATED APPLICATION

This application claims the priority benefit of Republic of Korea Patent Application No. 10-2018-0133753, filed on Nov. 2, 2018 in the Korean Intellectual Property Office, the disclosure of which is incorporated herein by reference in its entirety.

BACKGROUND

Field of the Disclosure

The present disclosure relates to ultrasonic sensors, ultrasonic sensing devices, ultrasonic display devices, and biometric information sensing methods.

Description of the Related Art

As the information society has developed at a rapid rate, there is an increasing need for display devices employing advanced technologies and more efficient methods. Recently, various types of display devices, such as Liquid Crystal Display (LCD), Plasma Display Panel (PDP), and Organic Light Emitting Display (OLED) devices, have been developed and utilized.

In order to provide more various functions to a user, some touch sensing enabled display devices provide the function of detecting the touch of a user associated medium (e.g., a stylus pen or part of a user's body) on a display panel, or recognizing a part of the user's body (e.g., a fingerprint) contacting or approaching the display panel, and then performing an associated operation based on the detected information.

As one scenario to provide such a function, an optical sensor may be used to recognize biometric information; however, when the optical sensor is disposed in the bezel area of the display panel, there is a problem that the active area becomes reduced. Further, when the optical sensor is disposed inside of the display panel, there is a problem that it affects display driving or causes the accuracy of the sensing to be lowered.

In such a situation, there is a need for preventing the active area of the display panel from being reduced, and at the same time, improving the accuracy of sensing biometric information with respect on the display panel.

SUMMARY

Accordingly, the present disclosure is directed to ultrasonic sensors, ultrasonic sensing devices, ultrasonic display devices, and biometric information sensing methods that substantially obviate one or more problems due to limitations and disadvantages of the prior art. It is at least one object of the present disclosure to provide an ultrasonic sensor and a display device including the ultrasonic sensor, capable of recognizing user's biometric information in an active area of a display panel.

It is at least one object of the present disclosure to provide an ultrasonic sensor and a display device including the ultrasonic sensor, capable of reducing power consumption of the ultrasonic sensor and improving the accuracy of sensing.

In accordance with one aspect of the present disclosure, an ultrasonic sensor is provided that includes: a plurality of scan lines, a plurality of sensing lines intersecting the plurality of scan lines, and a plurality of pixels disposed in areas defined by the intersecting of the scan lines and the sensing lines, each of the pixels including: a first transistor controlled by a scan signal applied to at least one scan line, and connected to a first driving voltage line, a second transistor connected to at least one sensing line, a third transistor connected between the second transistor and the sensing line, and a capacitor including a first electrode connected to the first transistor and connected to the gate electrode of third transistor, a second electrode connected to a second driving voltage line, and a piezoelectric material disposed between the first electrode and the second electrode. Here, in the ultrasonic sensor, the first transistor disposed in an N-th pixel column and the second transistor disposed in an (N+1)th pixel column are driven by a same scan line, and a channel type of the first transistor can be different from that of the second transistor.

In some embodiments, when a scan signal with a level capable of turning on the first transistor disposed in the N-th pixel column is applied to the same scan line, the second transistor disposed in the (N+1)th pixel column is turned off.

In some embodiments, in a driving interval, a scan signal with a level capable of turning on the first transistor is applied to the at least one of the plurality of scan lines. In a sensing interval separated in time from the driving interval, a scan signal with a level capable of turning off the first transistor is applied to the plurality of scan lines. In some embodiments, in a first driving interval, the scan signal with the level capable of turning on the first transistor is applied to a scan line driving the first transistor disposed in the N-th pixel column. In a second driving interval, the scan signal with the level capable of turning on the first transistor is applied to a scan line driving the first transistor disposed in the (N+1)th pixel column. In the sensing interval between the first driving interval and the second driving interval, the scan signal with the level capable of turning off the first transistor is applied to the plurality of scan lines. In some embodiments, a pixel column that includes the first transistor generates ultrasonic waves. In some embodiments, in the sensing interval, the first transistor disposed in each of the plurality of pixels is turned off, and the second transistor disposed in each of the plurality of pixels is turned on. In some embodiments, in the sensing interval, a sensing signal is detected through the at least one of the plurality of sensing lines connected to the second transistor.

In some embodiments, a first driving voltage applied to the first driving voltage line is an alternating current (AC) voltage, and a second driving voltage applied to the second driving voltage line is a direct current (DC) voltage.

In some embodiments, a sensing voltage applied to the sensing voltage line is a direct current (DC) voltage.

In some embodiments, the first electrode comprises physically distinct electrodes that correspond to pixels or pixel columns, and the electrodes are disposed in the corresponding pixels or pixel columns, and the second electrode of the capacitor is commonly disposed in at least two pixels.

In some embodiments, the ultrasonic sensor includes a scan driving circuit and a sensing circuit. The scan driving circuit outputs a scan signal to the plurality of scan lines and the sensing circuit detects a sensing signal through the plurality of sensing lines. In some embodiments, in each driving interval, the scan driving circuit outputs a scan signal with a level capable of turning on the first transistor to the at least one of the plurality of scan lines, and in a sensing interval between driving intervals, the scan driving circuit outputs a scan signal with a level capable of turning off the first transistor to the plurality of scan lines.

In some embodiments, a display device is provided that includes: a display panel, and the ultrasonic sensor described above which is disposed on at least one surface of the display device Some embodiments relate to an ultrasonic sensor including a plurality of scan lines, a plurality of sensing lines intersecting the plurality of scan lines, and a plurality of pixels disposed in areas defined by intersecting of the plurality of scan lines and the plurality of sensing lines. Each of a first pixel and a second pixel include transistors and a capacitor. A first transistor is connected to a first driving voltage line and has a gate electrode connected to a first scan line. A second transistor is connected to a sensing line and has a gate electrode connected to a second scan line. A third transistor is connected between the second transistor and a sensing voltage line. The capacitor includes a first electrode connected to the first transistor and connected to a gate electrode of the third transistor, a second electrode connected to a second driving voltage line, and a piezoelectric material disposed between the first electrode and the second electrode. During a first driving interval, the first transistor of the first pixel is turned on to generate ultrasonic waves from the first pixel. During a first sensing interval, the second transistor of the first pixel and the second transistor of the second pixel are turned on to sense ultrasonic waves via the first and second pixels.

In some embodiments, the first pixel and the second pixel are adjacent to each other and the first scan line of the first pixel and the second scan line of the second pixel are a same scan line. In some embodiments, during the first driving interval, the first transistor of the first pixel is turned on by applying a first scan signal to the same scan line, and during the first sensing interval, the second transistor of the second pixel is turned on by applying a second scan signal to the same scan line. In some embodiments, during the first driving interval, the first scan signal turns off the second transistor of the second pixel, and during the first sensing interval, the second scan signal turns off the first transistor of the first pixel.

In some embodiments, a channel type of the first transistor of the first pixel is different than a channel type of the second transistor of the second pixel In some embodiments, a third pixel also includes the first, the second, and the third transistors. During a second driving interval, the first transistor of the second pixel is turned on to generate ultrasonic waves from the second pixel. During a second sensing interval, the second transistors of the first, the second, and the third pixels are turned on to sense ultrasonic waves via the first, the second, and third pixels.

In some embodiments, during the first sensing interval a first portion of pixel rows sense ultrasonic waves during a first subinterval and a second portion of pixel rows sense ultrasonic waves during a second subinterval, wherein the second subinterval occurs subsequent to the first subinterval.

In accordance with embodiments of the present disclosure, by configuring a transistor for controlling the application of a driving voltage and a transistor used for detecting a sensing signal, which are controlled by an identical and/or same scan line, with different channel types, a driving interval for generating ultrasonic waves can be separated in time from a sensing interval.

Accordingly, an interval in which a high voltage is applied for generating ultrasonic waves can be reduced. Thus, it is possible to reduce the power and reduce or eliminated the degradation of an array of thin film transistors.

In addition, sensing can be performed in an area in which ultrasonic waves are generated; it is therefore possible to improve sensing sensitivity. Additional features and advantages of the disclosure will be set forth in the description which follows and in part will be apparent from the description, or may be learned by practice of the disclosure. The objectives and other advantages of the disclosure will be realized and attained by the structure particularly pointed out in the written description and claims hereof as well as the appended drawings.

DETAILED DESCRIPTION

Figure 1:
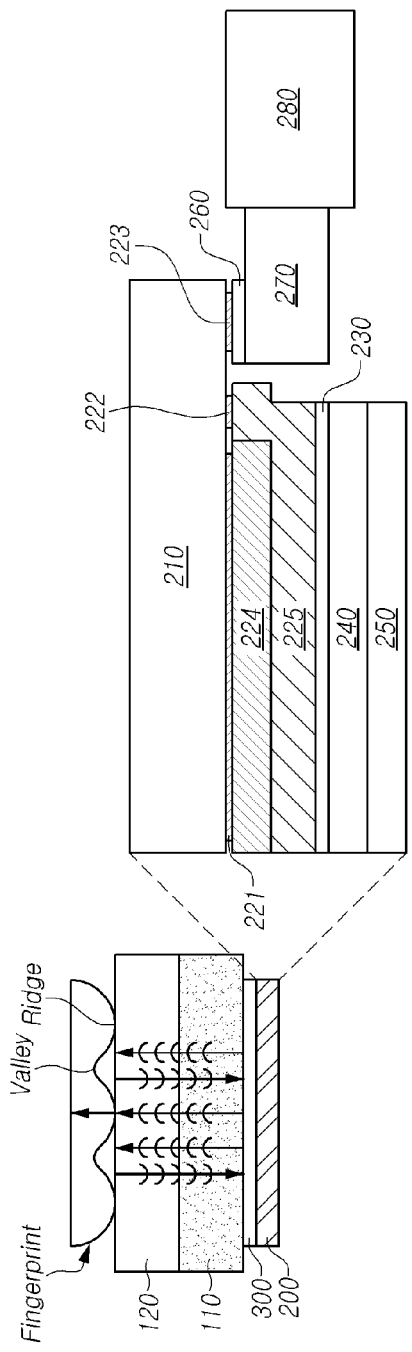
FIG. 1 is a diagram illustrating a structure in which an ultrasonic sensor is disposed in a display device, according to embodiments of the present disclosure.

Hereinafter, embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a diagram illustrating a structure in which an ultrasonic sensor 200 is disposed in a display device according to embodiments of the present disclosure.

Referring to FIG. 1, a display device according to embodiments of the present disclosure can include a display panel 110 in which a plurality of gate lines, a plurality of data lines, and a plurality of subpixels are disposed, and several types of driving circuits for driving signal lines and voltage lines disposed in the display panel 110.

An ultrasonic sensor 200 or an ultrasonic sensing device for sensing biometric information (e.g., a fingerprint) contacting or approaching the display panel 110 can be disposed at least one surface of the display device.

For example, the ultrasonic sensor 200 can be disposed on an opposite surface of an image-displaying surface in the display panel 110. The ultrasonic sensor 200 can be attached to the display panel 110 through an adhesive 300. The adhesive 300 can be, e.g., formed of resin.

The ultrasonic sensor 200 can generate ultrasonic waves, detect ultrasonic waves reflected from a fingerprint contacting cover glass 120, and then recognize the fingerprint in contact with the cover glass 120.

Specifically, when the ultrasonic waves generated from the ultrasonic sensor 200 reach valleys of the fingerprint, the ultrasonic waves contact air existing between the cover glass 120 and the skin of the valleys. Here, most of the ultrasonic waves in contact with the air may be reflected due to a difference between the cover glass 120 and the acoustic impedance of air.

Further, when the ultrasonic waves generated from the ultrasonic sensor 200 reach ridges of the fingerprint, the ultrasonic waves reach the skin of the fingerprint in contact with the cover glass 120 and the skin of the valleys. Here, some of ultrasonic waves having reached the skin of the ridges may be reflected, but most of the ultrasonic waves may travel up to the inside of the skin and then reflected from the inside area of the skin.

Accordingly, the ultrasonic sensor 200 can detect the fingerprint by distinguishing fingerprint features of the ridges and the valleys based on reception intensities or reception times (reception delays) of ultrasonic waves reflected after having reached the ridges and the valleys of the fingerprint.

Thus, since the ultrasonic sensor 200 uses a sensing scheme allowing an inside area of the skin to be sensed, it is not sensitive to the contamination or condition of the skin surface, and it is possible to provide high security related to the fingerprint corresponding to personal information. In addition, the display panel 110 enables the display device to detect a fingerprint without the reducing of an area in which an image is displayed.

The ultrasonic sensor 200 can include a material for generating ultrasonic waves, and several circuit elements for generating and sensing ultrasonic sensors.

For example, the ultrasonic sensor 200 can include a substrate 210, an array of thin film transistors 221 disposed over the substrate 210, a first pad 222, and a second pad 223. A piezoelectric material 224 and a common electrode 225 can be sequentially disposed in the array of thin film transistors 221.

The common electrode 225 can be adhered to a reflective layer 240 through an adhesive layer 230, and a passivation layer 250 can be disposed on the reflective layer 240.

A controller 280 supplying a signal, a voltage, or the like to the array of thin film transistors 221, the common electrode 225, or the like can be electrically connected to a second pad 223 disposed on the substrate 210 through a flexible printed circuit 270 and a conductive bond 260.

One or more transistors for enabling ultrasonic waves to be generated and sensing ultrasonic waves reflected from a fingerprint, an electrode for forming a capacitance, and the like can be disposed in the array of thin film transistors 221.

The electrode for forming the capacitance disposed in the array of thin film transistors 221 can form a capacitor C with the common electrode 225. The electrode and/or the common electrode 225 may include physically discrete electrodes that correspond with one or more pixels. For example, the electrodes are arranged along columns of pixels.

Further, a piezoelectric material 224 can vibrate by voltages applied to the electrode and the common electrode 225 disposed in the array of thin film transistors 221, and thus ultrasonic waves can be generated.

The array of thin film transistors 221, the piezoelectric material 224 and the common electrode 225 may be understood to constitute an array of pixels in a circuit.

The common electrode 225 can be disposed using a method of coating silver ink, or be disposed to cover the whole area of the piezoelectric material 224 or in a preconfigured pattern.

The reflective layer 240 can be formed of a metal, such as copper or the like, and can perform a function of reflecting ultrasonic waves reflected from a fingerprint to the array of thin film transistors 221.

The passivation layer 250 can be formed of polyimide, and can perform a function of capping an array of pixels and the reflective layer 240, and the like of the ultrasonic sensor 200.

A signal and a voltage for driving the array of pixels may be supplied from the controller 280. In some embodiments, a signal voltage or the like not requiring a high voltage may be supplied from a driving circuit disposed for driving the display panel 110.

Hereinafter, a driving scheme and a sensing scheme of the ultrasonic sensor 200 will be discussed with reference to a circuit structure of the array of pixels.

Figure 2:
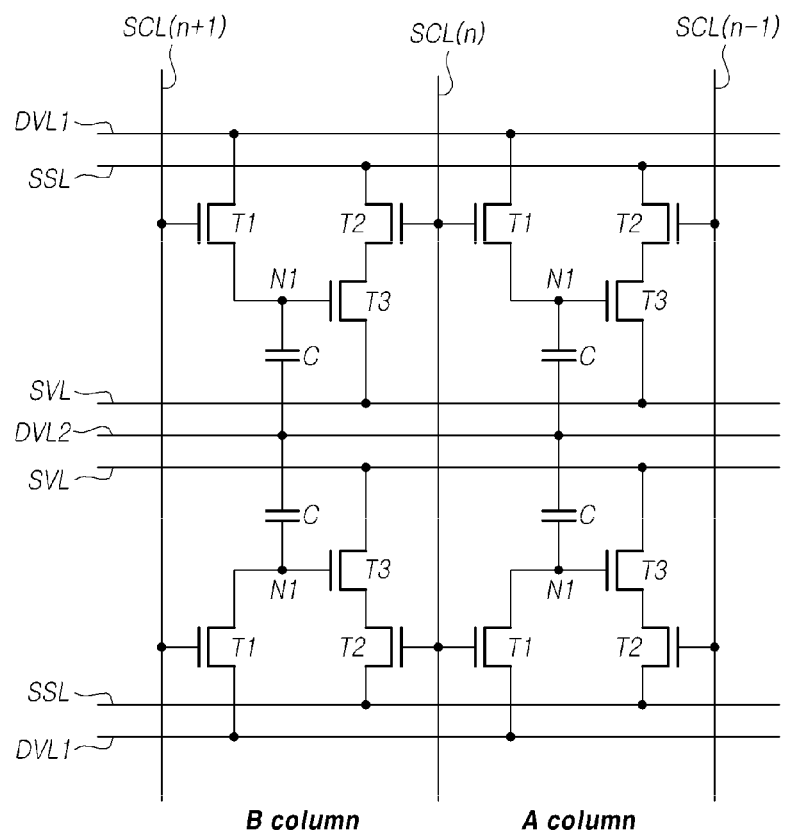
FIG. 2 is a diagram illustrating a circuit structure of an array of pixels of the ultrasonic sensor, according to embodiments of the present disclosure.

FIG. 2 is a diagram illustrating a circuit structure of an array of pixels of the ultrasonic sensor 200 according to embodiments of the present disclosure.

Referring to FIG. 2, a plurality of scan lines SCL and a plurality of sensing lines SSL can be disposed in the array of pixels of the ultrasonic sensor 200. The scan lines SCL and the sensing lines SSL can be disposed by intersecting each other, and a plurality of pixels can be disposed in areas formed by the intersection of the scan lines SCL and the sensing lines SSL.

In addition, voltage lines can be disposed for supplying a driving voltage DV, a sensing voltage SV, or the like for ultrasonic wave generating and sensing in the array of pixels.

The ultrasonic sensor can include a scan driving circuit for driving the plurality of scan lines, and a sensing circuit for detecting sensing signals through the plurality of sensing lines.

Each pixel of the array of pixels may include several circuit elements for ultrasonic wave generating and sensing.

For example, each pixel can include a first transistor T1 and a second transistor T2 controlled by one or more scan signals SCO applied to one or more scan lines SCL, a third transistor T3 controlled by a voltage in a first node N1, and one capacitor C.

A first transistor T1 is controlled by a scan signal SCO applied to a scan line SCL, and electrically connected between a first driving voltage line DVL1 and the first node N1.

The first driving voltage line DVL1 can deliver a first driving voltage DV1 for generating ultrasonic waves to a pixel. Such first driving voltage DV1 may be an AC voltage with a high voltage level in the form of pulse, for example, an AC voltage swinging between +100V and −100V.

The second transistor T2 is controlled by a scan signal SCO applied to a scan line SCL, and electrically connected between a sensing line SSL and the third transistor T3.

The first transistor T1 and the second transistor T2, which are disposed in pixels adjacent to each other, can be driven by an identical scan line SCL.

That is, as shown in FIG. 2, the first transistor T1 disposed in an A column and the second transistor T2 disposed in a B column are connected to an identical n-th scan line SCL(n), and may be simultaneously driven by an n-th scan signal SCO(n) applied to the n-th scan line SCL(n).

The third transistor T3 may be controlled by a voltage level in the first node N1, and can be electrically connected between a sensing voltage line SVL and the second transistor T2.

A sensing voltage SV applied to the sensing voltage line SVL may be a constant voltage (e.g., direct current (DC) voltage).

The capacitor C can be electrically connected between the first node N1 and a second driving voltage line DVL2.

That is, one electrode of the capacitor C connected to the first node N1 may mean an electrode for forming a capacitance disposed in the array of thin film transistors 221 described above, and the other electrode of the capacitor C connected to the second driving voltage line DVL2 may mean a common electrode 225.

The common electrode 225 may be an electrode commonly connected to at least two pixels.

The second driving voltage line DVL2 can supply a second driving voltage DV2 for generating ultrasonic waves to one or more pixels (e.g., an AC voltage), and the second driving voltage DV2 may be a constant voltage (e.g., DC voltage).

The scan signals SCO are sequentially applied to the scan lines SCL disposed in the array of pixels; thus, ultrasonic waves can be generated and sensing can be performed.

For example, when an n-th scan signal SCO(n) with a level capable of turning on the first transistor is applied to an n-th scan line SCL(n), the first transistor T1 disposed in the A column becomes turned on.

Since the first transistor T1 is turned on, a first voltage DV1 is applied to the first node N1.

Since a high voltage in the form of pulse and a constant voltage are applied to both electrodes of the capacitor C, the piezoelectric material 224 disposed between electrodes of the capacitor C can vibrate and thus ultrasonic waves can be generated.

That is, ultrasonic waves are generated in the A column in which the first transistor T1 is turned on.

At this time, since the n-th scan signal SCO(n) with the level capable of turning on the first transistor is applied to the n-th scan line SCL(n), the second transistor T2 disposed in the B column becomes turned on.

In a situation where the first transistor T1 disposed in the B column is turned off, when ultrasonic waves reflected from a fingerprint reach the B column, a voltage level in the first node N1 of a pixel disposed in the B column can change. That is, the polarization state of the piezoelectric material 224 disposed in the B column can change by the reflected ultrasonic waves. Since the polarization state of the piezoelectric material 224 changes, a voltage level of the first node N1 can change.

As the voltage level of the first node N1 changes, the third transistor T3 becomes turned on and/or off, and since the second transistor T2 is turned on, a sensing voltage SV can be detected through the sensing line SSL.

That is, ultrasonic waves reflected from the fingerprint can be sensed in the B column in which the second transistor T2 is turned on.

Thus, since the first transistor T1 and the second transistor T2 disposed in pixel columns adjacent to each other are driven by the identical scan line SCL, the generating and sensing of ultrasonic waves can be performed in adjacent pixel columns.

At this time, as the first transistor T1 and the second transistor T2 are driven by the identical scan line SCL, there is a problem that the first driving voltage DV1, which is a high voltage, is applied even in the interval where sensing is performed. In addition, sensing sensitivity may be lowered because the ultrasonic wave generating area is not matched to the sensing area.

In accordance with embodiments of the present disclosure, the ultrasonic sensor 200 is provided for enabling sensing to be performed in an ultrasonic wave generating area, power consumption to be reduced, and the degradation of an array of thin film transistors 221 to be reduced.

Figure 3:
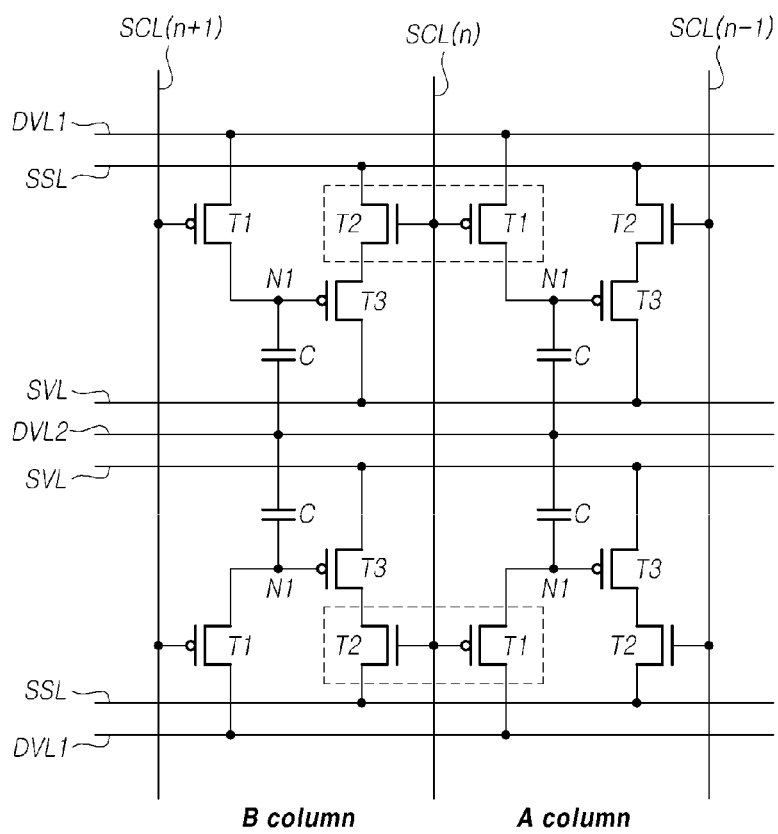
FIG. 3 is a diagram illustrating a circuit structure of another array of pixels of the ultrasonic sensor, according to embodiments of the present disclosure.

FIG. 3 is a diagram illustrating a circuit structure of another array of pixels of the ultrasonic sensor 200 according to embodiments of the present disclosure.

Referring to FIG. 3, a plurality of scan lines SCL, a plurality of sensing lines SSL, and a plurality of pixels can be disposed in the array of pixels of the ultrasonic sensor 200. In addition, a first driving voltage line DVL1, a second driving voltage line DVL2 and a sensing voltage line SVL, to which voltages for ultrasonic wave generating and sensing are applied are disposed in the array of pixels.

Each pixel can include a first transistor T1 and a second transistor T2 controlled by one or more scan signals SCO applied to one or more scan lines SCL, a third transistor T3 controlled by a voltage in a first node N1, and one capacitor C.

The first transistor T1 is controlled by the scan signal SCO applied to the scan line SCL, and electrically connected between the first driving voltage line DVL1 and the first node N1.

The second transistor T2 is controlled by the scan signal SCO applied to the scan line SCL, and electrically connected between the sensing line SSL and the third transistor T3.

The third transistor T3 may be controlled by a voltage level in the first node N1, and can be electrically connected between the sensing voltage line SVL and the second transistor T2.

The capacitor C is electrically connected between the first node N1 and the second driving voltage line DVL2, and a piezoelectric material can be disposed between both electrodes of the capacitor C.

Here, the first transistor T1 and the second transistor T2 disposed in pixel columns adjacent to each other can be driven by an identical scan line SCL.

Channel types of the first and second transistors T1 and T2 driven by the identical scan line SCL are different from each other.

That is, as in the example shown in FIG. 3, the first transistor T1 for allowing the first driving voltage DV1 to be applied to the first node N1 may be a p-type, and the second transistor T2 for allowing a sensing signal to be detected through the sensing line SSL may be an n-type.

Alternatively, the first transistor T1 may be an n-type, and the second transistor T2 may be a p-type.

Further, the third transistor T3 controlled according to a voltage level in the first node N1 may share a channel type with the first transistor T1 or the second transistor T2 (e.g., a p-type, or an n-type).

Since the channel types of the first and second transistors T1 and T2 (driven by the identical scan line SCL) are different from each other, the first transistor T1 and the second transistor T2 are turned on and/or off in an opposite way to each other, according to a scan signal SCO applied to the scan line SCL.

That is, when an n-th scan signal SCO(n) with a level capable of turning on the first transistor T1 is applied to an n-th scan line SCL(n), the first transistor T1 disposed in an A column becomes turned on. In addition, the second transistor T2 disposed in a B column becomes turned off.

On the other hand, when an n-th scan signal SCO(n) with a level capable of turning off the first transistor T1 is applied to an n-th scan line SCL(n), the first transistor T1 disposed in the A column becomes turned off. In addition, the second transistor T2 disposed in the B column becomes turned on.

Accordingly, the first transistor T1 for generating ultrasonic waves and the second transistor T2 for sensing ultrasonic waves operate in an opposite way to each other; therefore, a driving interval for generating ultrasonic waves and a sensing interval for sensing ultrasonic waves can be separated in time from each other.

Further, ultrasonic wave sensing can be performed in an area (e.g., the A column) where ultrasonic waves are generated; therefore, sensing sensitivity can be improved.

Specifically, in a driving interval, when the n-th scan signal SCO(n) with the level capable of turning on the first transistor is applied to the n-th scan line SCL(n), the first transistor T1 disposed in the A column becomes turned on, and the first driving voltage DV1 is applied to the first node N1.

Since a high voltage in the form of pulse is applied to the first node N1, and a constant voltage is applied to the second driving voltage line DVL2, ultrasonic waves can be generated in the A column by the vibration of the piezoelectric material 224 between both electrodes of the capacitor C electrically connected between the first node N1 and the second driving voltage line DVL2.

Here, since the second transistor T2 disposed in the B column is turned off, sensing may not be performed.

Further, in a sensing interval, when the n-th scan signal SCO(n) with the level capable of turning off the first transistor is applied to the n-th scan line SCL(n), the first transistor T1 disposed in the A column becomes turned off, and the second transistor T2 disposed in the B column becomes turned on.

Further, in the sensing interval, since scan signals SCO (n−1) and SCO(n+1) with the level for turning off the first transistor are applied to the remaining scan lines SCL(n−1) and SCL(n+1) respectively, the second transistor T2 disposed in the A column becomes turned on.

Accordingly, a sensing signal can be detected according to a voltage variation in the first node N1 by ultrasonic waves reflected from a fingerprint in the A column where ultrasonic waves are generated.

That is, since ultrasonic waves can be detected in the A column where the ultrasonic waves are generated, it is possible to improve sensing sensitivity.

In the sensing interval, since the second transistors T2 of all pixels disposed in the array of pixels are turned on, and sensing signals can be detected on a pixel row basis, it is therefore possible to detect ultrasonic waves reflected from the A column where ultrasonic waves are generated to an adjacent column, and further to improve sensing sensitivity.

In addition, since the driving interval for generating ultrasonic waves is separated in time from the sensing interval, an interval in which the high voltage for generating ultrasonic waves is applied can be reduced, and therefore, it is possible to reduce power consumption and to reduce the degradation of the array of thin film transistors 221 caused by applying the high voltage.

Figure 4:
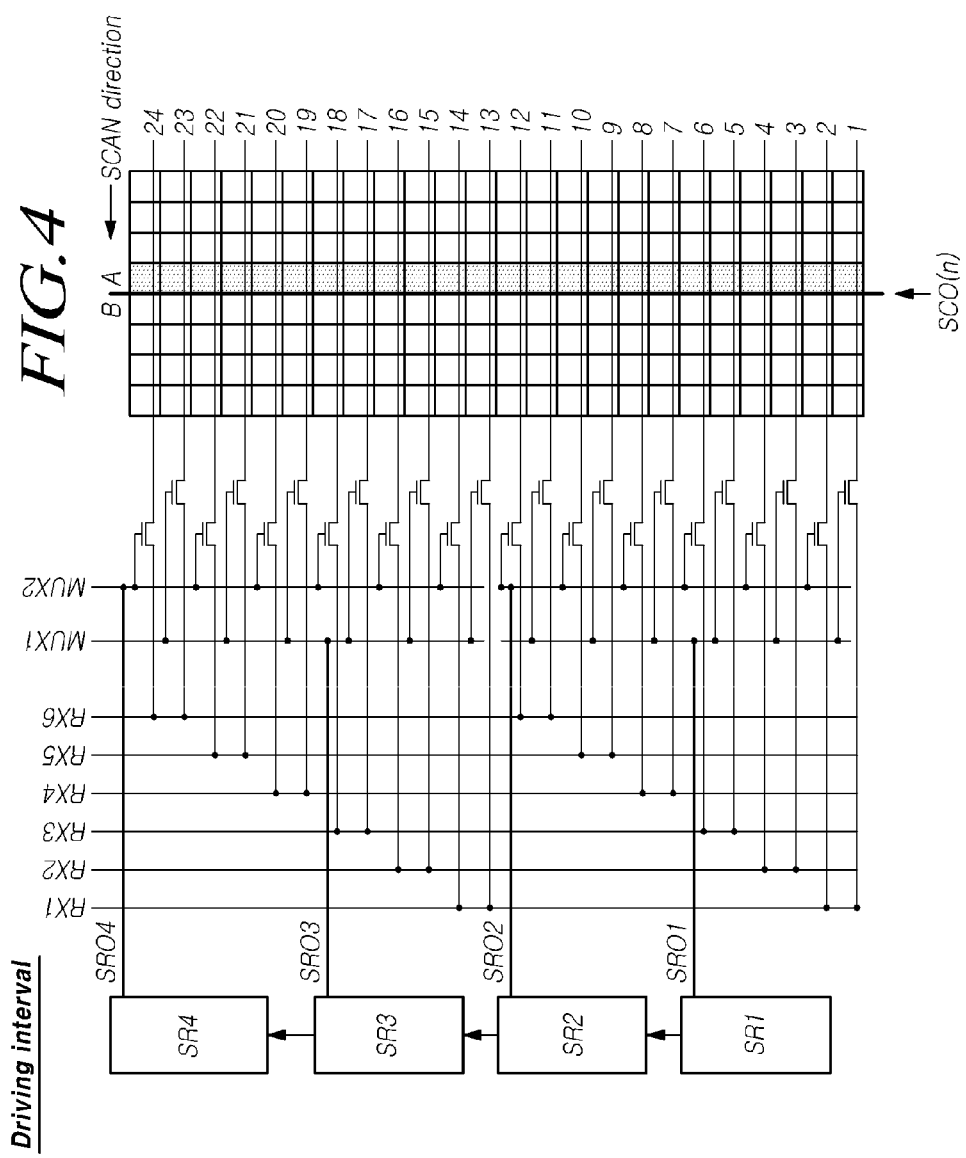
FIG. 4 is a diagram illustrating an area in which ultrasonic waves are generated in a driving interval in the ultrasonic sensor including the array of pixels shown in FIG. 3, according to embodiments of the present disclosure.

FIG. 4 is a diagram illustrating an area in which ultrasonic waves are generated in a driving interval in the ultrasonic sensor 200 including the array of pixels shown in FIG. 3.

Referring to FIG. 4, scan signals SCO are sequentially applied to a plurality of scan lines SCL disposed in the array of pixels; therefore, ultrasonic waves can be generated on a pixel column basis.

Pixels disposed in the array of pixels can be connected to a sensing circuit on a pixel row basis, and one or more pixel rows can be connected to the sensing circuit through at least one multiplexer controlled according to at least one shift register signal SRO outputted from at least one shift register SR.

That is, in the driving interval, the at least one multiplexer MUX connecting between a plurality of sensing lines SSL disposed in the array of pixels and the sensing circuit is turned off, and ultrasonic waves can be generated from a pixel column to which a scan signal SCO with a level capable of turning on the first transistor T1 is applied (e.g., column A in FIG. 4).

In the sensing interval, the second transistors T2 disposed in the pixels can be turned on, and sensing signals can be detected by driving the at least one multiplexer MUX connecting between the sensing lines SSL and the sensing circuit.

Figure 5:
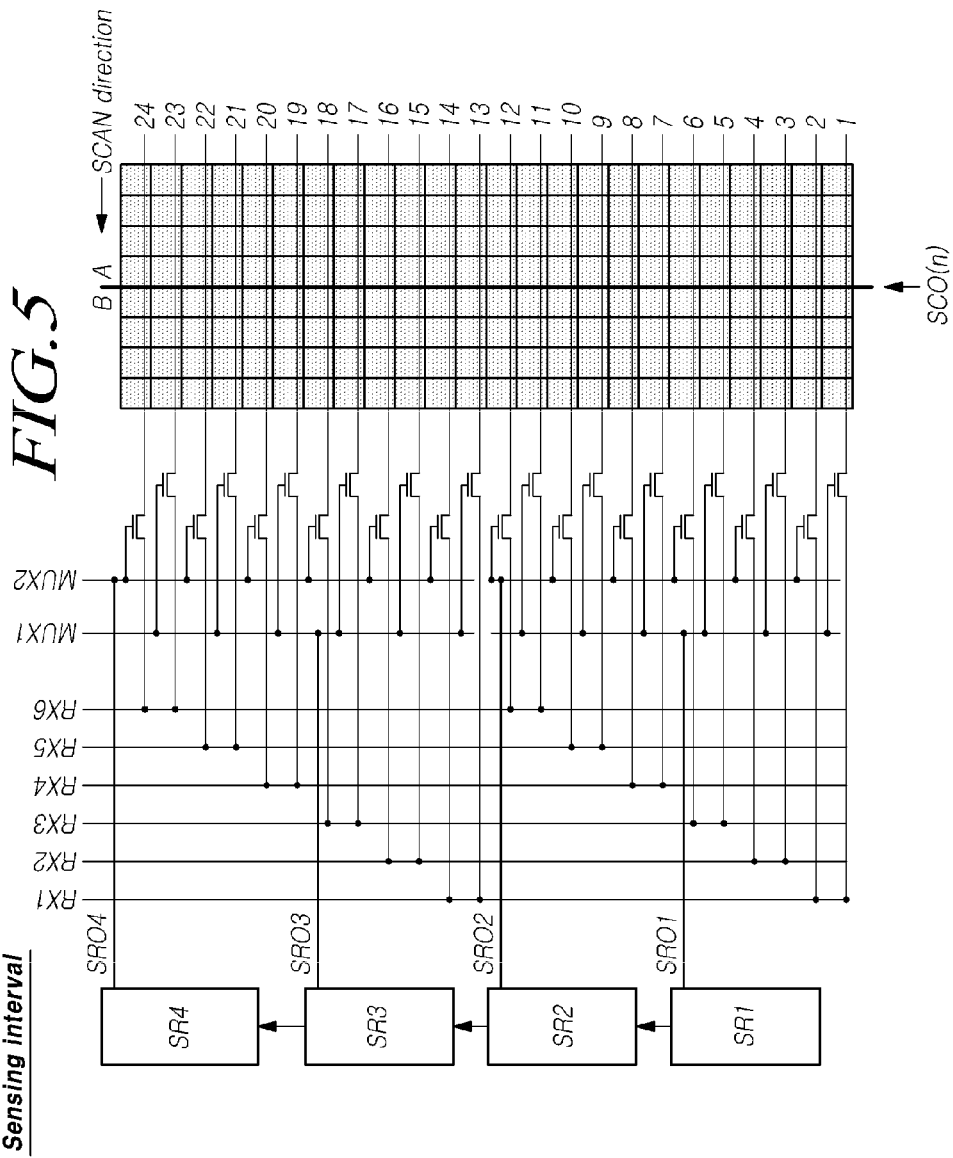
FIG. 5 is a diagram illustrating an area in which ultrasonic waves are sensed in a sensing interval in the ultrasonic sensor including the array of pixels shown in FIG. 3, according to embodiments of the present disclosure.

FIG. 5 is a diagram illustrating an area in which ultrasonic waves are sensed in a sensing interval in the ultrasonic sensor 200 including the array of pixels shown in FIG. 3.

Referring to FIG. 5, in the sensing interval, scan signals SCO with a level capable of turning off the first transistor T1 are applied to the plurality of scan lines SCL disposed in the array of pixels.

Since the scan signals SCO with the level capable of turning off the first transistor T1 are applied, the second transistors T2 disposed in pixels of the array of pixels become turned on.

Accordingly, reflected ultrasonic waves can be sensed by all pixels disposed in the array of pixels, and in particular, reflected ultrasonic waves can be sensed by a pixel column where ultrasonic waves are generated. In some embodiments, only a portion of pixels (e.g., 2 pixels) sense ultrasonic waves during the sensing interval. For example, scan signals SCO are only applied to two scan lines SCL during the sensing interval in such embodiments.

In the sensing interval, the at least one multiplexer MUX according to the at least one shift register signal SRO outputted from the at least one shift register SR can be turned on, and therefore, the sensing lines SSL disposed in the array of pixels and the sensing circuit can be connected to each other. For example, when two multiplexers are driven, a first multiplexer MUX1 and a second multiplexer MUX2 can be sequentially turned on.

As the first multiplexer MUX1 becomes turned on, sensing signals detected through sensing lines disposed in oddnumbered pixel rows of the array of pixels can be delivered to the sensing circuit through at least one reception line RX.

As the second multiplexer MUX2 becomes turned on, sensing signals detected through sensing lines disposed in even-numbered pixel rows of the array of pixels can be delivered to the sensing circuit through the at least one reception line RX.

Thus, since the first transistor T1 and the second transistor T2 are disposed in a structure where the driving interval and the sensing interval are separated in time from each other, it is possible to sense ultrasonic waves reflected from the area where ultrasonic waves are generated.

Further, since applying a high voltage to a driving voltage line consumes power and applies stress to the related circuits, the driving interval in which ultrasonic waves are generated can be reduced to reduce power consumption and stress.

Further, since the first transistor T1 and the second transistor T2 disposed in pixel columns adjacent to each other are driven by the identical scan line SCL, it is therefore possible to provide higher resolution in comparison with a structure where the first transistor T1 and the second transistor T2 are driven by separate scan lines.

Figure 6:
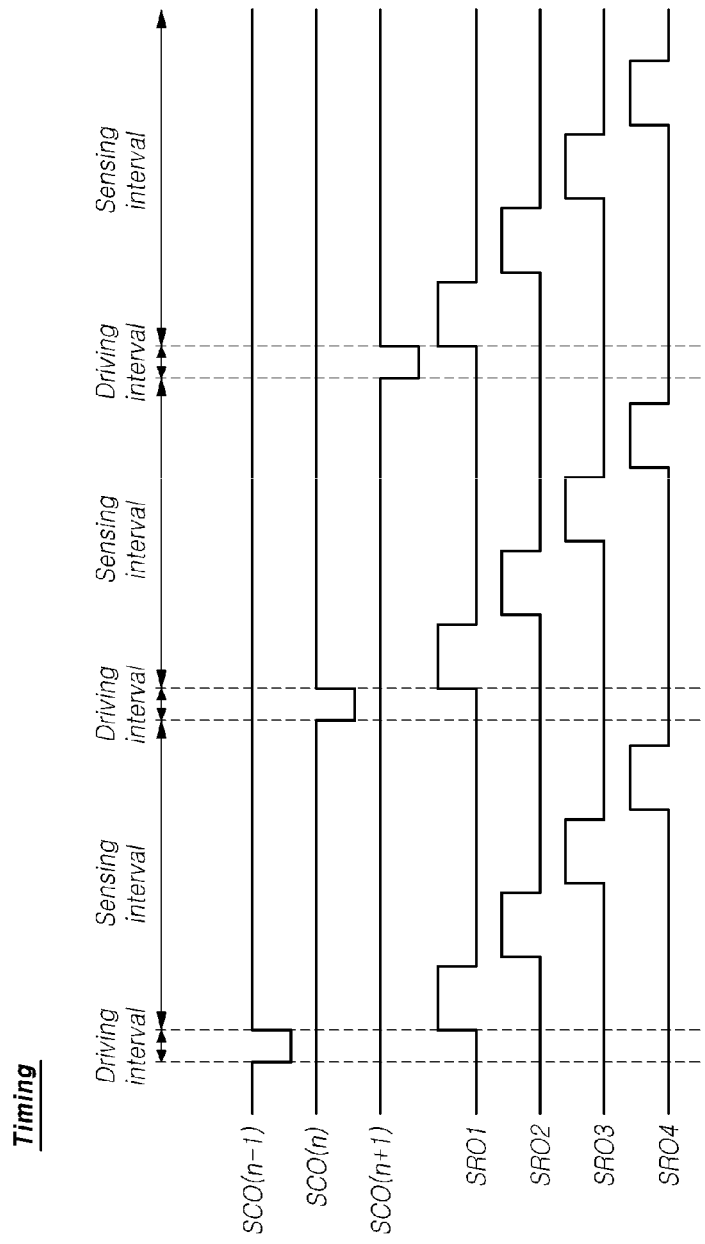
FIG. 6 is a diagram illustrating driving and sensing timings of the ultrasonic sensor including the array of pixels shown in FIG. 3, according to embodiments of the present disclosure.

FIG. 6 is a diagram illustrating driving and sensing timings of the ultrasonic sensor 200 including the array of pixels shown in FIG. 3.

Referring to FIG. 6, in one or more driving intervals, the ultrasonic sensor 200 sequentially outputs scan signals SCO with a level capable of turning on the first transistor T1 disposed in the pixels to scan lines SCL disposed in the array of pixels.

Further, sensing signals can be detected through sensing lines SSL disposed in the array of pixels in a sensing interval between two driving intervals in which scan signals SCO are outputted to respective scan lines SCL adjacent to each other.

For example, in a driving interval, an (n−1)th scan signal SCO(n−1) with a level capable of turning on the first transistor T1 disposed in a pixel driven by an (n−1)th scan line SCL(n−1) is applied to the (n−1)th scan line SCL(n−1).

At this time, during the driving interval, at least one shift register SR controlling at least one multiplexer connecting the sensing lines SSL to the sensing circuit outputs a shift register signal SRO with a level capable of turning off the at least one multiplexer MUX.

In a sensing interval after the driving interval, an (n−1)th scan signal SCO(n−1) with a level capable of turning off the first transistor T1 disposed in the pixel driven by the (n−1)th scan line SCL(n−1) is applied to the (n−1)th scan line SCL(n−1).

Further, scan signals SCO(n) and SCO(n+1) with the level capable of turning off the first transistors driven by the remaining scan lines SCL(n) and SCL(n+1) remain in the respective scan lines SCL(n) and SCL(n+1).

Thus, in the sensing interval, second transistors T2 disposed in the pixels of the array of pixels become turned on.

In the sensing interval, as shift register signals SRO with a level capable of turning on the at least one multiplexer MUX are sequentially outputted from shift registers SR, the sensing lines SSL and the sensing circuit disposed in the array of pixels become electrically connected.

Since the second transistor T2 disposed in each pixel is turned on, a sensing voltage can be detected through the sensing line by turn-on and/or turn-off of a third transistor T3 caused by reflected ultrasonic waves.

Thus, when ultrasonic wave generating and sensing are completed in a pixel column including the first transistor T1 driven by the (n−1)th scan line SCL(n−1), an n-th scan signal SCO(n) is outputted to an n-th scan line SCL(n), and ultrasonic wave generating and sensing are performed in a pixel column including a first transistor T1 driven by the n-th scan line SCL(n).

That is, by sequentially driving pixel columns disposed in the array of pixels and generating ultrasonic waves, it is possible to detect sensing signals caused by ultrasonic waves reflected from an area in which ultrasonic waves are generated in the sensing interval separated in time from the driving interval for generating ultrasonic waves.

Figure 7:
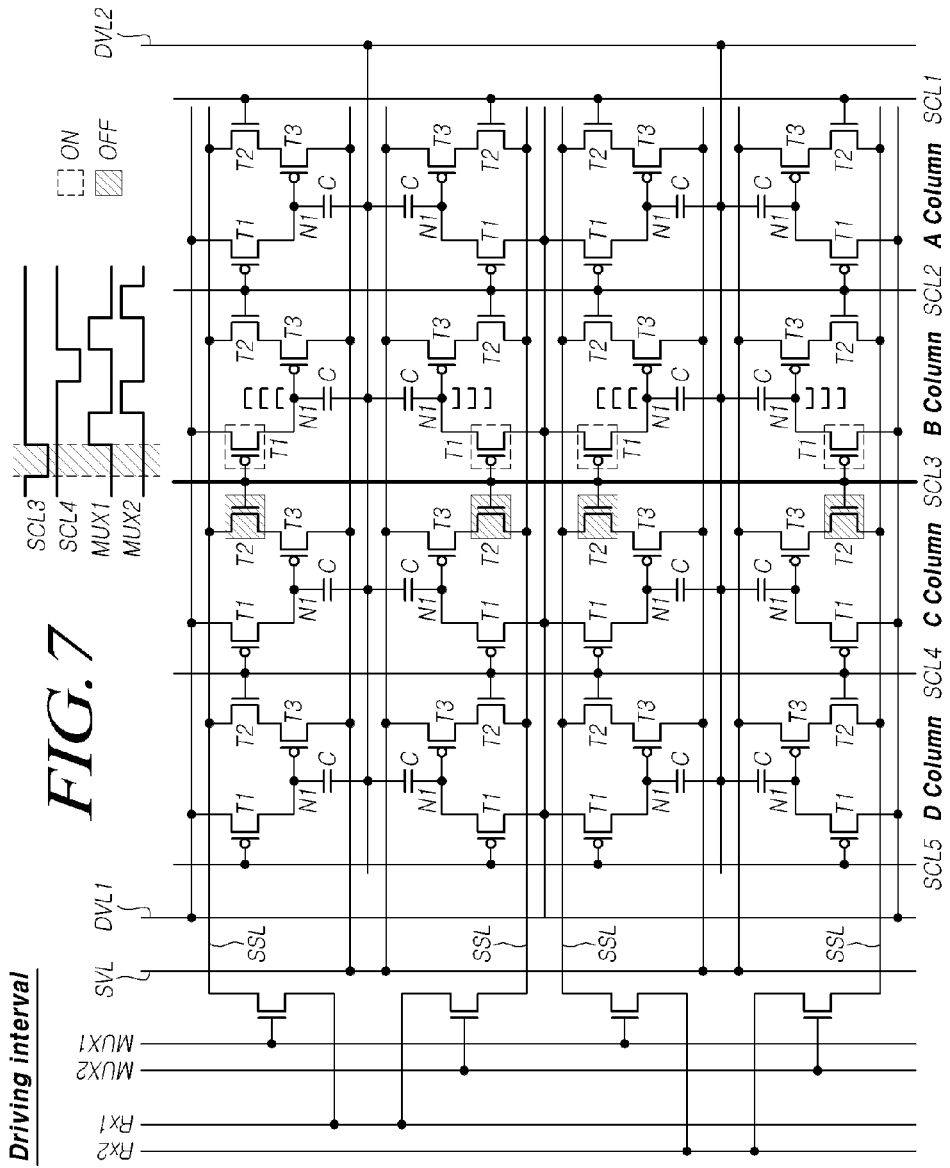
FIG. 7 is a diagram illustrating the operation of the array of pixels disposed in the ultrasonic sensor in the driving interval in accordance with the timings shown in FIG. 6, according to embodiments of the present disclosure.

FIG. 7 is a diagram illustrating the operation of an array of pixels disposed in the ultrasonic sensor 200 in a driving interval in accordance with the timings shown in FIG. 6, and illustrates operations of pixels arranged with four rows and four columns in the array of pixels.

Referring to FIG. 7, a plurality of scan lines SCL and a plurality of sensing lines SSL can be disposed in the array of pixels. Further, a first driving voltage line DVL1 and a second driving voltage line DVL2 for supplying driving voltages for generating ultrasonic waves, and a sensing voltage line SVL for supplying a sensing voltage for sensing are disposed in the array of pixels.

Each pixel can include a first transistor T1 for controlling the application of a first driving voltage DV1 for ultrasonic wave generating, a second transistor T2 for controlling sensing, a third transistor T3 for controlling the output of a sensing voltage caused by reflected ultrasonic waves, a capacitor for ultrasonic wave generating, and the like.

In the array of pixels, one or more multiplexers MUX for controlling the detection of sensing signals though one or more sensing lines SSL, one or more reception lines RX for delivering the sensing signals to the sensing circuit, and the like can be disposed in at least a part outside of an area in which the pixels are disposed in the array of pixels.

In a driving interval, a scan signal SCO with a level capable of turning on the first transistor T1 driven by a corresponding scan line SCL can be applied to the scan line SCL.

In the array of pixels, such scan signals SCO can be sequentially applied to the plurality of scan line SCL.

To better understand the operation of the array of pixels shown in FIG. 7, the following embodiment describes a situation where a third scan signal SCO3 is applied to a third scan line SCL3. In a driving interval, the third scan signal SCO3 with a level capable of turning on the first transistor T1 disposed in a B column is applied to the third scan line SCL3.

As the third scan signal SCO3 is applied, since the first transistor T1 disposed in the B column becomes turned on, therefore, the first driving voltage DV1 supplied through the first driving voltage line DVL1 is applied to a first node N1 disposed in the B column.

Further, a piezoelectric material disposed between both electrodes of the capacitor C vibrates by a high voltage in the form of pulse applied to the first node N1 and a second driving voltage DV2 which is a constant voltage supplied through the second driving voltage line DVL2, and thus ultrasonic waves are generated in the B column.

Since the third scan signal SCO3 with the level capable of turning on the first transistor T1 is applied to the third scan line SCL3, the second transistor T2 disposed in a C column driven by the third scan line SCL3 is in a turn-off state. Accordingly, sensing cannot be performed in the C column.

At this time, a first multiplexer MUX1 and a second multiplexer MUX2 connected to the sensing lines SSL disposed in the array of pixels remain a turn-off state.

Accordingly, even when second transistors T2 in pixel columns except for the C column are turned on, sensing may not be performed in the driving interval in which ultrasonic waves in the B column are generated.

Figure 8:
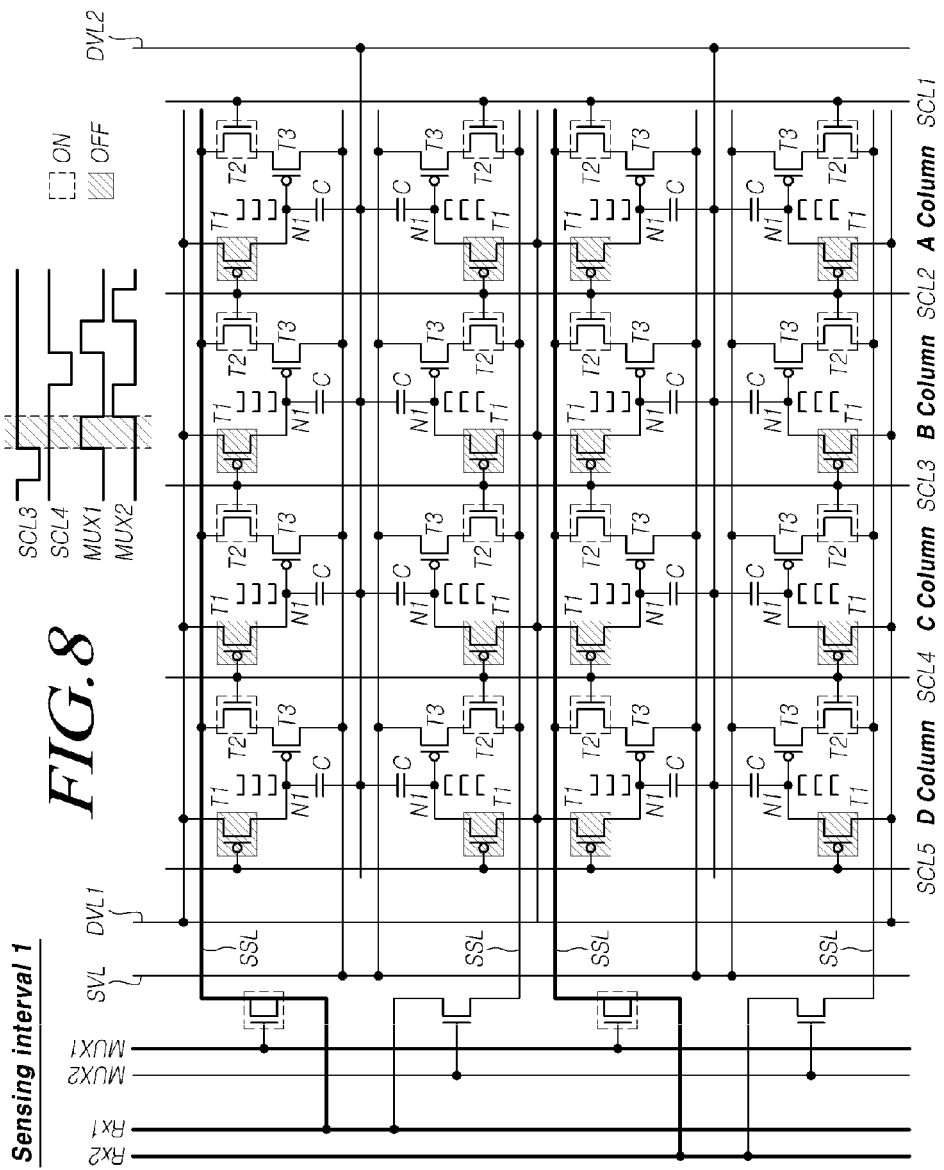
FIGS. 8 and 9 are diagrams illustrating the operation of the array of pixels disposed in the ultrasonic sensor in the sensing interval in accordance with the timings shown in FIG. 6, according to embodiments of the present disclosure.
Figure 9:
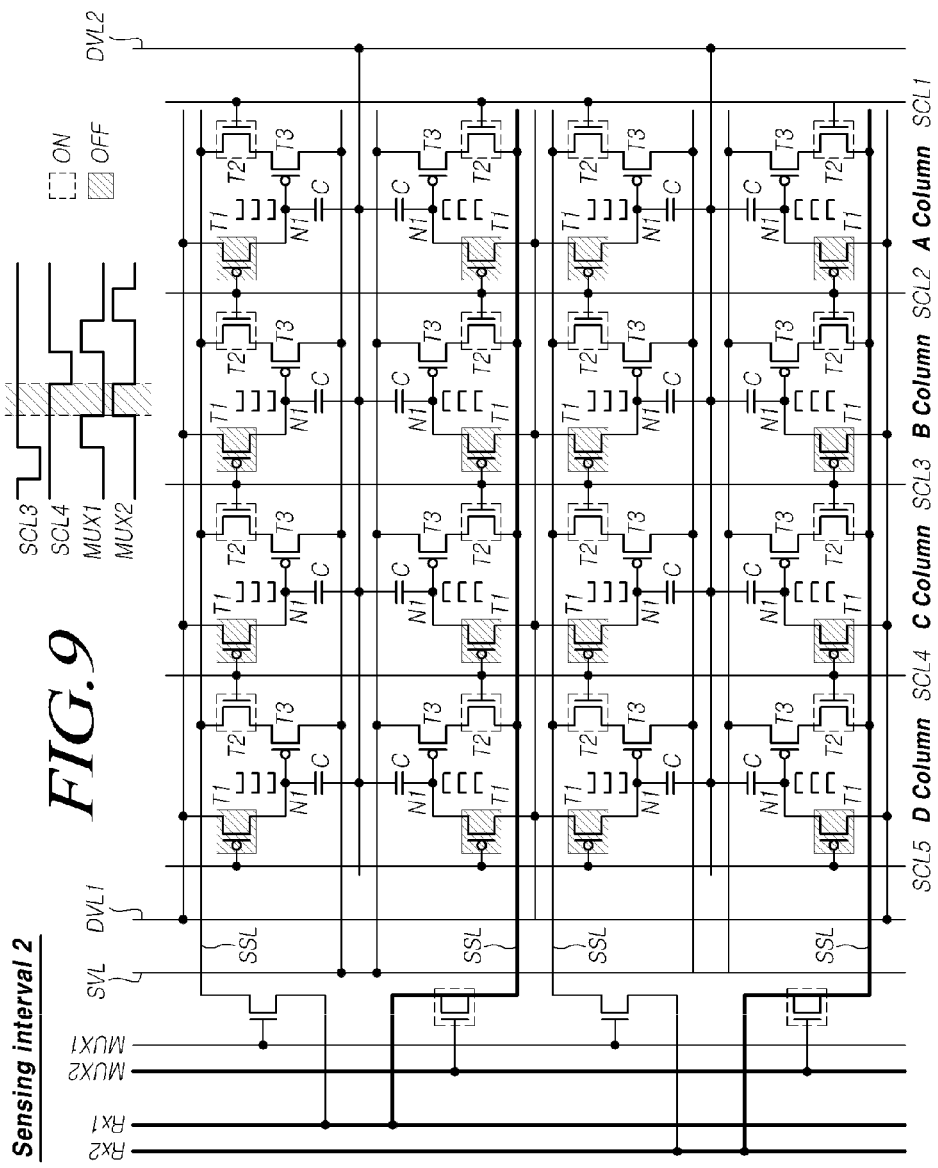

FIGS. 8 and 9 are diagrams illustrating the operation of the array of pixels disposed in the ultrasonic sensor in a sensing interval in accordance with the timings shown in FIG. 6.

Referring to FIGS. 8 and 9, in the sensing interval, the third scan signal SCO3 with a level capable of turning off the first transistor T1 disposed in the B column is applied to the third scan line SCL3.

Accordingly, the first transistor T1 disposed in the B column is in a turn-off state, first transistors T1 disposed remaining pixel columns remain a turn-off state.

Since scan signals SCO with the level capable of turning off the first transistor T1 are applied to respective scan lines SCL, the second transistor T2 driven by a corresponding scan line SCL becomes a turn-on state.

Since the second transistor T2 disposed in each pixel is in the turn-on state, when a voltage in the first node N1 of the pixel by reflected ultrasonic waves vary, a sensing voltage SV outputted by the turn-on and/or turn-off of the third transistor T3 can be detected through the sensing line SSL.

In the sensing interval, the multiplexers MUX connected to the sensing lines SSL sequentially operate, and sensing signals detected through the sensing lines SSL can be transferred to the sensing circuit.

For example, as in sensing interval 1 shown in FIG. 8, the first multiplexer MUX1 is turned on; therefore, sensing signals from pixel rows including sensing lines SSL connected to the first multiplexer MUX1 can be transferred to the sensing circuit through the reception line RX.

In the sensing interval 1, the second multiplexer MUX2 remains the turn-off state.

Further, as in sensing interval 2 shown in FIG. 9, the first multiplexer MUX1 becomes turned off, and the sensing multiplexer MUX2 becomes turned on, and therefore, sensing signals from pixel rows including sensing lines SSL connected to the second multiplexer MUX2 can be transferred to the sensing circuit through the reception line RX.

Thus, by performing sensing ultrasonic waves after the driving interval in which ultrasonic waves are generated in the pixel column, the sensing is performed in an area in which ultrasonic waves is generated; therefore, sensing sensitivity can improve.

Further, in the sensing interval, since a high voltage for generating ultrasonic waves is not applied during the sensing interval, an interval for applying the high voltage reduces; therefore, power consumption can reduce, and the degradation of components constituting the ultrasonic sensor can be overcome or reduce.

Figure 10:
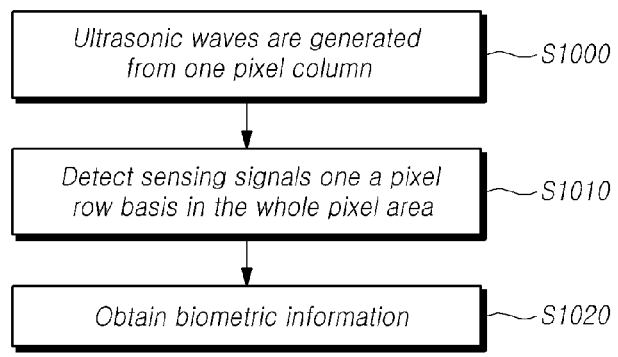
FIG. 10 is a flow diagram illustrating a process of sensing biometric information, according to embodiments of the present disclosure.

FIG. 10 is a flow diagram illustrating a process of sensing biometric information according to embodiments of the present disclosure.

Referring to FIG. 10, the ultrasonic sensor 200 in accordance with embodiments of the present disclosure generates ultrasonic waves by driving a pixel column disposed in the array of pixels in a driving interval, at step S1000.

The ultrasonic sensor 200 detects one or more sensing signals on a pixel row basis in all or part of the area in which the array of pixels is disposed in a sensing interval after a driving interval, at step S1010.

Further, biometric information, such as a fingerprint, or the like, can be obtained based on the detected sensing signals, at step S1020.

According to the embodiments of the present disclosure, by configuring a first transistor T1 driven by an identical scan line SCL in the array of pixels of the ultrasonic sensor 200 and controlling the application of a high voltage and a second transistor T2 controlling sensing with different channel types, a driving interval for generating ultrasonic waves and a sensing interval for sensing ultrasonic waves are separated in time from each other.

Accordingly, an interval in which a high voltage is applied for generating ultrasonic waves can reduce; thus, it is possible to prevent power consumption from increasing and an array of thin film transistors from being degraded.

Further, in the sensing interval, since sensing can be performed in the whole pixel area and performed in the area in which ultrasonic waves are generated, therefore, it is possible to improve sensing sensitivity.

Although embodiments of the present disclosure have been described for illustrative purposes, those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An ultrasonic sensor comprising:
    a plurality of scan lines;
    a plurality of sensing lines intersecting the plurality of scan lines; and
    a plurality of pixels disposed in areas defined by intersecting of the plurality of scan lines and the plurality of sensing lines,
    wherein each of the plurality of pixel comprises:
        a first transistor controlled by a scan signal applied to at least one of the plurality of scan lines, and connected to a first driving voltage line;
        a second transistor connected to at least one of the plurality of sensing lines;
        a third transistor connected between the second transistor and a sensing voltage line; and
        a capacitor including a first electrode connected to the first transistor and connected to a gate electrode of third transistor, a second electrode connected to a second driving voltage line, and a piezoelectric material disposed between the first electrode and the second electrode,
    wherein the first transistor disposed in an N-th pixel column and the second transistor disposed in an (N+1) th pixel column are driven by a scan signal via a same scan line, and a channel type of the first transistor is different from a channel type of the second transistor, and
    wherein in a driving interval, when the scan signal has a first level, one of the first transistor disposed in the N-th pixel column and the second transistor disposed in the (N+1)th pixel column is turned on to generate ultrasonic waves while the other of the first transistor disposed in the N-th pixel column and the second transistor disposed in the (N+1)th pixel column is turned off, and in a sensing interval separated in time from the driving interval, when the scan signal has a second level, while the one of the first transistor disposed in the N-th pixel column and the second transistor disposed in the (N+1)th pixel column is turned off, the other of the first transistor disposed in the N-th pixel column and the second transistor disposed in the (N+1)th pixel column is turned on to sense the generated ultrasonic waves.

2. The ultrasonic sensor according to claim 1, wherein when the scan signal has a level capable of turning on the first transistor disposed in the N-th pixel column and is applied to the same scan line, the second transistor disposed in the (N+1)th pixel column is turned off.

3. The ultrasonic sensor according to claim 1, wherein in the driving interval, the scan signal has a level capable of turning on the first transistor and is applied to the at least one of the plurality of scan lines, and wherein in the sensing interval separated in time from the driving interval, the scan signal has a level capable of turning off the first transistor and is applied to the plurality of scan lines.

4. The ultrasonic sensor according to claim 3, wherein:
in a first driving interval, the scan signal with the level capable of turning on the first transistor is applied to a scan line driving the first transistor disposed in the N-th pixel column,
in a second driving interval, the scan signal with the level capable of turning on the first transistor is applied to a scan line driving the first transistor disposed in the (N+1)th pixel column, and
in the sensing interval between the first driving interval and the second driving interval, the scan signal with the level capable of turning off the first transistor is applied to the plurality of scan lines.

5. The ultrasonic sensor according to claim 3, wherein in the driving interval, a pixel column that includes the first transistor generates ultrasonic waves.

6. The ultrasonic sensor according to claim 3, wherein in the sensing interval, the first transistor disposed in each of the plurality of pixels is turned off, and the second transistor disposed in each of the plurality of pixels is turned on.

7. The ultrasonic sensor according to claim 3, wherein in the sensing interval, a sensing signal is detected through the at least one of the plurality of sensing lines connected to the second transistor.

8. The ultrasonic sensor according to claim 1, wherein a first driving voltage applied to the first driving voltage line is an alternating current (AC) voltage, and a second driving voltage applied to the second driving voltage line is a direct current (DC) voltage.

9. The ultrasonic sensor according to claim 1, wherein a sensing voltage applied to the sensing voltage line is a direct current (DC) voltage.

10. The ultrasonic sensor according to claim 1, wherein the first electrode comprises physically distinct electrodes that correspond to pixels or pixel columns, and the electrodes are disposed in the corresponding pixels or pixel columns, and the second electrode of the capacitor is commonly disposed in at least two pixels.

11. The ultrasonic sensor according to claim 1, further comprising:

a scan driving circuit outputting a scan signal to the plurality of scan lines; and
a sensing circuit detecting a sensing signal through the plurality of sensing lines.

12. The ultrasonic sensor according to claim 11, wherein in each driving interval, the scan driving circuit outputs a scan signal with a level capable of turning on the first transistor to the at least one of the plurality of scan lines, and in a sensing interval between driving intervals, the scan driving circuit outputs a scan signal with a level capable of turning off the first transistor to the plurality of scan lines.

13. A display device comprising a display panel and the ultrasonic sensor of claim 1.

14. An ultrasonic sensor comprising:
a plurality of scan lines;
a plurality of sensing lines intersecting the plurality of scan lines; and
a plurality of pixels disposed in areas defined by intersection of the plurality of scan lines and the plurality of sensing lines,
wherein each of a first pixel and a second pixel comprises:
a first transistor connected to a first driving voltage line and having a gate electrode connected to a first scan line;
a second transistor connected to a sensing line and having a gate electrode connected to a second scan line;
a third transistor connected between the second transistor and a sensing voltage line; and
a capacitor including a first electrode connected to the first transistor and connected to a gate electrode of the third transistor, a second electrode connected to a second driving voltage line, and a piezoelectric material disposed between the first electrode and the second electrode,
wherein the first transistor disposed in the first pixel in a first column and the second transistor disposed in the second pixel in a second column adjacent to the first column are driven by a scan signal via a same scan line, and
wherein during a first driving interval, when the scan signal has a first level, one of the first transistor of the first pixel in the first column and the second transistor of the second pixel in the second column is turned on to generate ultrasonic waves from the first pixel while the other of the first transistor of the first pixel in the first column and the second transistor of the second pixel in the second column does not sense the generated ultrasonic waves, and during a first sensing interval, when the scan signal has a second level, while the one of the first transistor of the first pixel in the first column and the second transistor of the second pixel in the second column is turned off, the second transistor of the first pixel in the first column and the other of the first transistor of the first pixel in the first column and the second transistor of the second pixel in the second column are turned on to sense ultrasonic waves via the first and second pixels.

15. The ultrasonic sensor of claim 14, wherein the first pixel and the second pixel are adjacent to each other and the first scan line of the first pixel and the second scan line of the second pixel are a same scan line.

16. The ultrasonic sensor of claim 15, wherein:
during the first driving interval, the first transistor of the first pixel is turned on by applying a first scan signal to the same scan line, and during the first sensing interval, the second transistor of the second pixel is turned on by applying a second scan signal to the same scan line.

17. The ultrasonic sensor of claim 16, wherein:
during the first driving interval, the first scan signal turns off the second transistor of the second pixel, and
during the first sensing interval, the second scan signal turns off the first transistor of the first pixel.

18. The ultrasonic sensor of claim 14, wherein a channel type of the first transistor of the first pixel is different than a channel type of the second transistor of the second pixel.

19. The ultrasonic sensor of claim 14, further comprising:
a third pixel also comprising the first, the second, and the third transistors, wherein:
during a second driving interval, the first transistor of the second pixel is turned on to generate ultrasonic waves from the second pixel, and
during a second sensing interval, the second transistors of the first, the second, and the third pixels are turned on to sense ultrasonic waves via the first, the second, and third pixels.

20. The ultrasonic sensor of claim 14, wherein during the first sensing interval a first portion of pixel rows sense ultrasonic waves during a first subinterval and a second portion of pixel rows sense ultrasonic waves during a second subinterval, wherein the second subinterval occurs subsequent to the first subinterval.

\* \* \* \* \*